April 26, 1966 G. J. BATORI 3,247,880
TIRE
Filed Nov. 25, 1964 4 Sheets-Sheet 1

INVENTOR
George J. Batori

BY Spencer & Kaye
ATTORNEYS

April 26, 1966 G. J. BATORI 3,247,880
TIRE
Filed Nov. 25, 1964 4 Sheets-Sheet 2

INVENTOR
George J. Batori

BY *Spencer & Kaye*
ATTORNEYS

April 26, 1966   G. J. BATORI   3,247,880
TIRE
Filed Nov. 25, 1964   4 Sheets-Sheet 3

INVENTOR
George J. Batori
BY Spencer & Kaye
ATTORNEYS

April 26, 1966 G. J. BATORI 3,247,880
TIRE

Filed Nov. 25, 1964 4 Sheets-Sheet 4

INVENTOR
George J. Batori

BY *Spencer & Kaye*
ATTORNEYS

United States Patent Office 3,247,880
Patented Apr. 26, 1966

3,247,880
TIRE
George J. Batori, 62 Oakwood Ave., Hamburg, N.Y.
Filed Nov. 25, 1964, Ser. No. 413,838
18 Claims. (Cl. 152—209)

The present invention relates to a tire.

More particularly, the present invention relates to a tire, herinafter referred to as a cogwheel tire, which has exceptionally great traction, especially as compared to heretofore conventional tires, both regular and so-called snow tires, it being the primary object of the present invention to provide a tire which is well suited for use on soft ground, such as mud or snow, and which is nevertheless well suited for use on hard and dry pavement.

With the above primary object in view, the present invention resides in a pneumatic tire of the type which, under load, becomes momentarily wider at that part which touches the ground than that part of the tire which is opposite the ground-touching part. The tire has a carcass and a plurality of pairs of cogs which are distributed circumferentially around the carcass and are integral with the carcass, the cogs of each pair being arranged on opposite sides of the carcass and projecting laterally from the opposite lateral faces of the carcass. Each cog extends laterally a distance such that the width of the tire in the region of the cogs is at least as great as the maximum width of the carcass and radially a distance such that the diameter of the tire in the region of the cogs, at least when the tire does not support a load, is at most as great as the maximum of the carcass, in consequence of which the cogs, when the tire, while supporting a load, is on soft ground, will be pressed deeper into the ground than the carcass.

In accordance with a preferred embodiment of the present invention, the cogs of each pair are in axial alignment with each other and hence directly opposite each other on opposite sides of the carcass, and the distance between corresponding points of consecutive pairs of cogs is at least as great as the length of the part of the tire which touches the ground.

Additional objects and advantages of the present invention will become apart upon consideration of the following description when taken in conjunction with the accompanying drawings in which.

Figure 15:
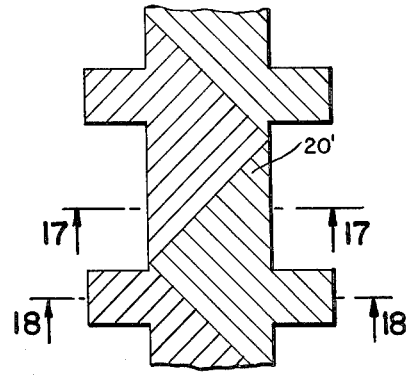
FIGURE 15 shows the snow or mud track left by the cogwheel tire according to the present invention.
Figure 17:
Figure 18:
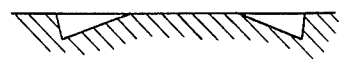

FIGURES 17 and 18 are sectional views along lines 17—17 and 18—18 of FIGURE 15 which are different points along the track left by a cogwheel tire according to the present invention.

Figure 19:
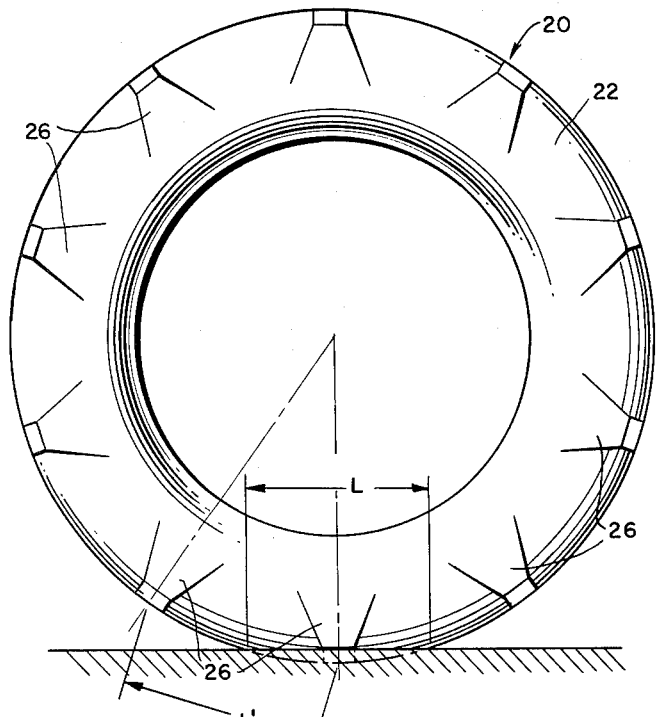

FIGURE 19 is a fragmentary elevational view of a cogwheel tire in accordance with the present invention.

Figure 20:
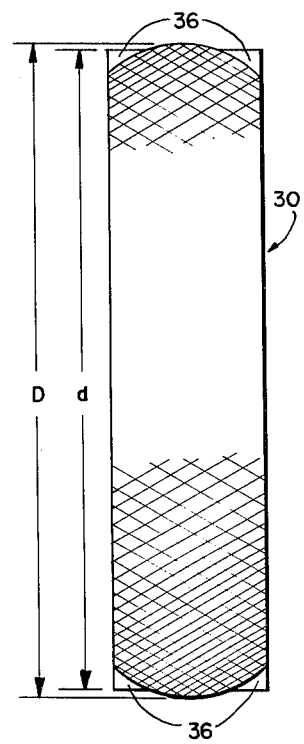

FIGURE 20 is an elevational view showing a modified embodiment of a cogwheel tire in accordance with the present invention.

Figure 21:
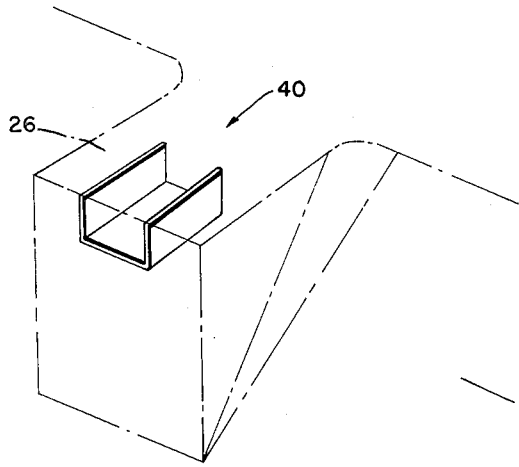

FIGURE 21 is a perspective view showing a cog with a metal insert embedded in it.

Figure 22:
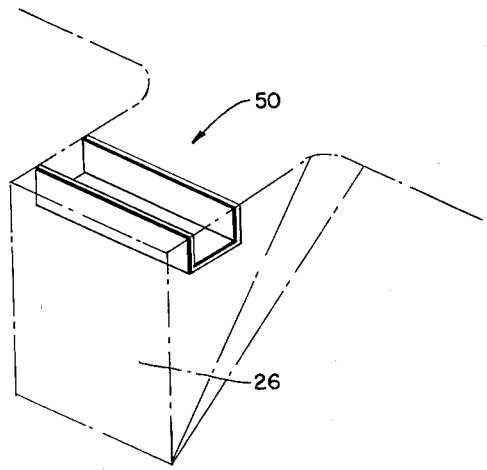

FIGURE 22 is a perspective view similar to FIGURE 21 but shows the insert as being oriented in a different direction.

Figure 23:
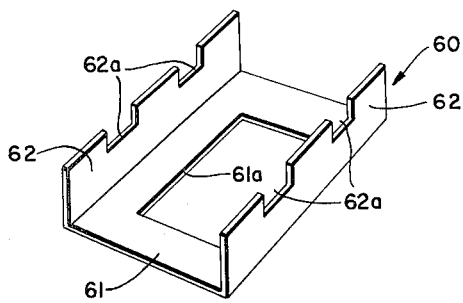

FIGURE 23 is a perspective view of a preferred embodiment of an insert suitable for embedding in the cog.

Figure 1:
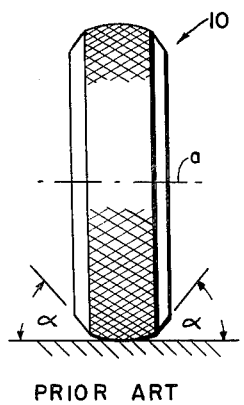
FIGURE 1 is an elevational view showing a conventional prior art tire while the same is not supporting a load.
Figure 2:
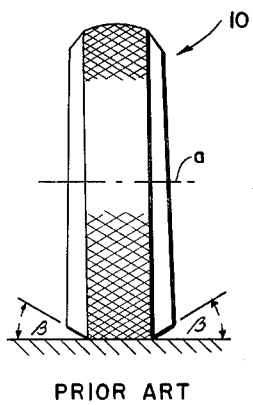
FIGURE 2 is an elevational view of the tire of FIGURE 1 but showing its widening at the bottom when such tires does support a load.

Referring now to the drawings and to FIGURES 1 and 2 thereof in particular, the same show a conventional low-pressure pneumatic tire of the type which, under load, becomes momentarily wider at that part which touches the ground than that part of the tire which is opposite the ground-touching part. FIGURE 1 shows the tire 10 while the same does not support a load so that the tire is substantially symmetrical about its central axis $a$, the angle between the sides of the tire and the ground being shown at $\alpha$. FIGURE 2, on the other hand, shows the deformation of the tire when the same does support a load, in consequence of which the two sides nearest to the ground bulge out so that the tire becames wider at the ground-touching part than at the diametrically opposite part, the angle between the bulging sides and the ground now being shown at $\beta$.

The cogwheel tire according to the present invention is based on the recongition of the above. Such a tire is shown, in FIGURES 3 and 4, at 20, and has a carcass 22 provided, at its peripheral surface, with a tread 24. The tire further has a plurality of pairs of cogs 26 which are distributed circumferentially around the carcass 22 and are integral therewith, the cogs of each pair being arranged on opposite sides of the carcass and projecting from the opposite sides of the lateral faces thereof. Each cog extends laterally a distance such that the width of the tire in the region of the cogs is at least as great as the maximum width of the carcass, with each cog extending radially a distance such that the diameter of the tire in the region of the cogs, at least when the tire does not support a weight, is at most as great as the maximum diameter of the carcass. Consequently, as shown in FIGURE 4, the distance $c$ is at least as great as the distance $b$, and the outer peripheral surfaces 26' of the cogs 26 do not extend downwardly beyond the outer peripheral surface 22' of the carcass 22; in FIGURE 4, the cog surfaces 26' are substantially flush with the outer peripheral surface 22' of the carcass 22.

Figure 4:
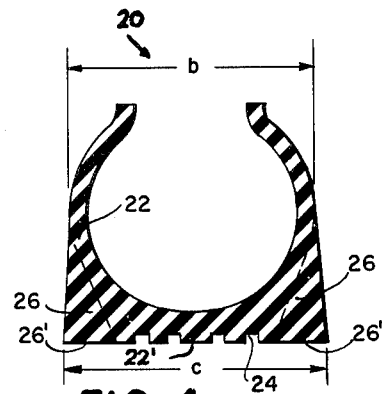
FIGURE 4 is a sectional view taken on line 4—4 of FIGURE 3.
Figure 3:
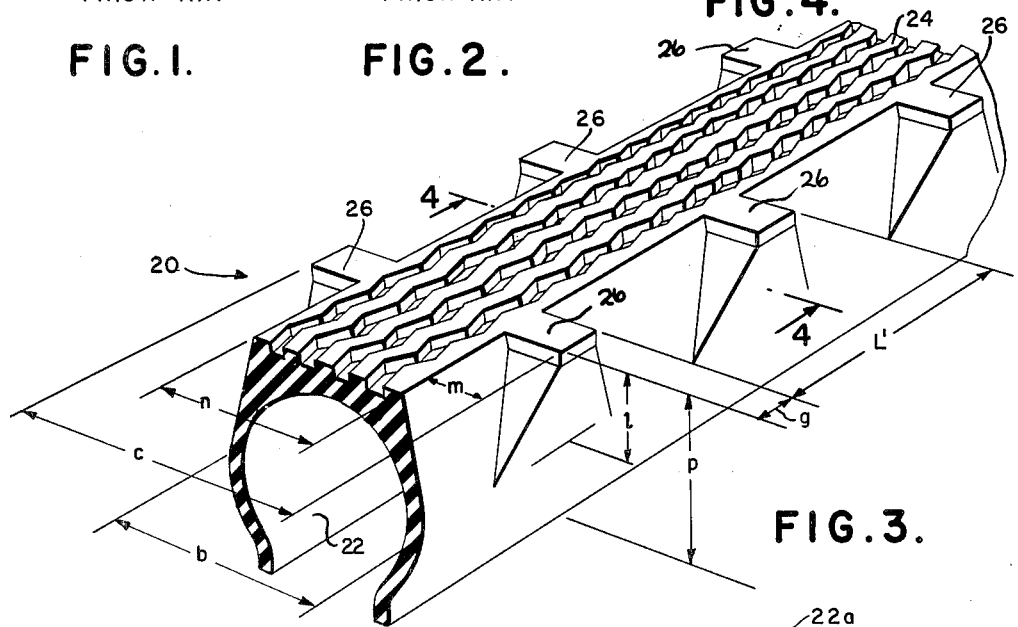
FIGURE 3 is a perspective view showing a section of a cogweel tire in accordance with the present invention; for purposes of facilitating illustration, the section is shown as extending generally rectilinearly.

As is also shown in FIGURES 3 and 4, the cogs extend radially inwardly to a point which is approximately level with the center of the cross section of the carcass 22.

Figure 5:
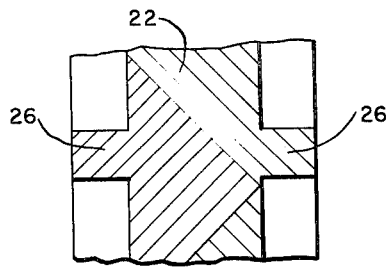
FIGURES 5, 6 and 7 are fragmentary elevational views showing, respectively, three configurations of the cogs.
Figure 6:
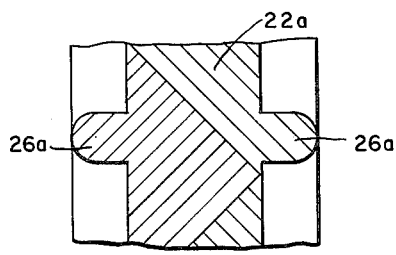
Figure 7:
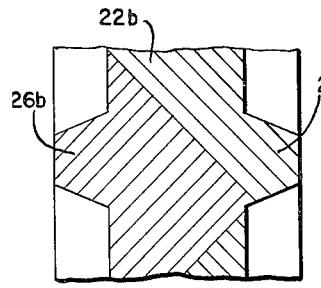

As shown in FIGURES 3 and 5, the cogs 26 have a generally rectangular configuration with square edges or, as shown in FIGURE 6, the tire carcass 22a may be equipped with generally rectangular cogs 26a having rounded edges. FIGURE 7 shows the tire carcass 22b as being provided with cogs 26b having a generally trapezoidal configuration.

Figure 8:
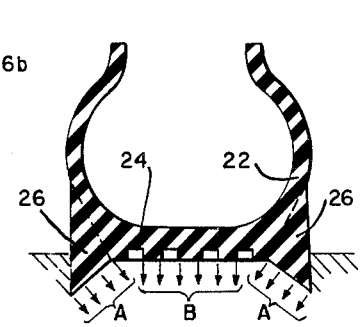
FIGURE 8 is a sectional view of a tire according to the present invention, also taken on line 4—4 of FIGURE 3, but showing the position of the parts while such tire is on soft ground, such as mud or snow, while the tire is under load.

FIGURE 8 shows the cross-sectional configuration of a tire according to the present invention while the same supports a load and rolls over, or rests upon, soft ground, such as snow or mud. The main carcass 22 is pressed downwardly, in the direction of the arrows B, while, due to the above-mentioned bulging effect described in connection with FIGURES 1 and 2, the cogs 26 will be made to press inwardly to exert forces shown in the direction of the arrows A. Thus, the carcass itself will have the usual supporting effect, while the cogs 26 produce what may be termed a "cling-to" effect.

Figure 9:
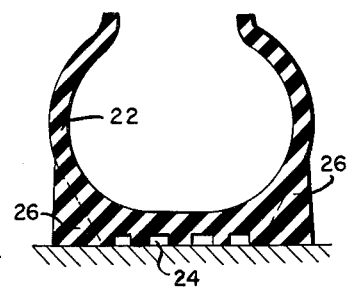
FIGURE 9 is a sectional view similar to FIGURE 8 but showing the position of the parts while the tire is on a hard surface.

FIGURE 9 shows the configuration of the tire according to the present invention while it is on a hard surface, e.g., a dry concrete or asphalt roadway.

Figure 10:
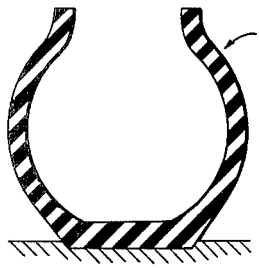
FIGURE 10 is a sectional view through a conventional regular tire.
Figure 12:
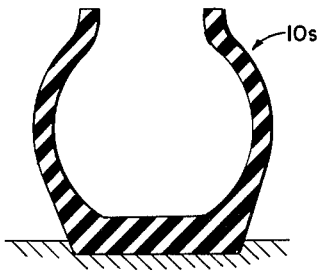
FIGURE 12 is a sectional view through a conventional snow tire.
Figure 16:
FIGURE 16 is a sectional view showing the track left by a conventional regular or snow tire, as shown in FIGURES 10 and 12.

FIGURES 10 through 16 show the action of a conventional regular tire, a conventional snow tire, and a cogwheel tire in accordance with the present invention. Thus, FIGURE 10 shows the conventional regular tire 10 moving over soft ground, so as to leave the track 10', shown in FIGURE 11. FIGURE 12 shows a conventional snow tire 10s which leaves a track 10s', shown in FIGURE 13, this track being wider than the track 10' shown in FIGURE 11. FIGURE 14 shows once again a cross section of the cogwheel tire 20 according to the present invention, while FIGURE 15 shows the track 20' which is left by tire 20. Thus, the cross-sectional configuration of the track left by a conventional regular tire 10 or snow tire 10s will, throughout its entire length, be as shown in FIGURE 16, while the cross section of the track left by the cogwheel tire 20 will alternate between the configurations shown in FIGURES 18 and 17.

FIGURE 19 shows the circumferential spacing of the cogs 26, the distance L' being the spacing between corresponding points of consecutive cogs on the same side of the carcass. The distance L is the length of the part of the tire which touches the ground while the tire is under load. The distance L' which is, in effect, the pitch between the cogs 26, is at least as great as the length L, thereby providing enough room for the cogs to cling to the ground.

It will be noted that, in the illustrated embodiments the cogs 26 of each pair are in axial alignment with each other and hence directly opposite each other on opposite sides of the carcass. This arrangement is preferred in order to enable the maximum traction to be obtained from the cogwheel tire. Indeed, it has been found that if the pair of cogs are not in axial alignment with each other, the traction is reduced by approximately 50% as compared to a cogwheel tire in which the cogs are, in fact, in axial alignment with each other.

Furthermore, the cogs have heretofore been shown as having outer peripheral surfaces which are substantially flush with the outer peripheral surface of the carcass. In practice, the tire may be modified as shown in FIGURE 20 in which there is shown a tire 30 which has cogs 36 whose outer peripheral surfaces are spaced radially inwardly from the outer peripheral surface of the carcass, that is to say, the diameter d is less than the maximum outside diameter D of the tire carcass. Provided the difference between the two dimensions is not too large, the cogs will act in the same manner as the cogs 26, described above, whose outer peripheral surfaces are substantially flush with the outer peripheral surface of the carcass.

It has been found that a cogwheel tire according to the present invention affords appreciably larger traction than a conventional snow tire. At the same time, the tire itself is readily usable under ordinary road conditions, i.e., on solid dry pavement, without resulting in excessive frictional losses or increased gasoline consumption. Moreover, it has been found that the cogs enable the tire to grip the road well during turns.

Yet another significant advantage of the cogs is that, at high speed, they act as cooling vanes which afford a unique and effective cooling on the entire tire surface.

The tire will, in practice, be made of rubber or equivalent materials, and the cogs are integral with the carcass; the integrality of the cogs with the carcass may be established either by originally manufacturing the carcass and cogs of one piece or by fabricating the carcass and cogs separately and thereafter permanently attaching the cogs to the carcass, as, for example, by vulcanizing. The use of separately manufactured cogs allows existing conventional tires to be converted into cogwheel tires according to the present invention.

The tread 24 of the tire can be of any suitable configuration.

Figure 14:
FIGURE 14 shows, on the same scale as FIGURES 10 and 12, a sectional view of a cogwheel tire according to the present invention.
Figure 11:
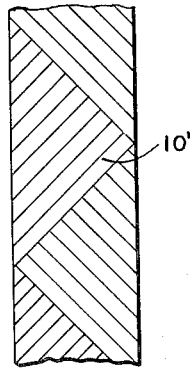
FIGURE 11 shows the snow or mud track left by the conventional tire of FIGURE 10.
Figure 13:
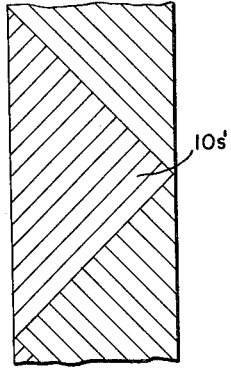
FIGURE 13 shows the snow or mud track left by the conventional snow tire of FIGURE 12.

The following is an illustrative and not limitative example of an actual cogwheel tire built in accordance with the present invention, reference being had to the tire illustrated in FIGURES 3, 14 and 19, and all dimensions being aprpoximate:

The tread width $n$ is 4½ inches. Each cog has a lateral width $m$ of 1½ inches so that $n+2m=c$ which is 7½ inches, and therefore greater than the maximum width $b$ of the tire carcass, the width $b$ being 6½ inches. The tire itself has a maximum outside diameter of 26 inches, with the height $p$ of the cross section of the tire being 5¼ inches. The cogs whose surfaces are flush with the outer peripheral surface of the tire, while the same is not under load, have a height $l$ of 1½ inches, thereby extending to a point which is approximately level with the center of the cross section of the carcass. Each cog extends a distance $g$ of 1.00 inch along the length of the periphery of the tire, with the distance L' between corresponding points of consecutive cogs being 5¾ inches. Under ordinary conditions, the length L of the tire which rests on the ground, under load, will be 4½ inches, so that L' will be seen to be at least as great as L.

The recommended tire pressure will depend on the particular vehicle on which the tire is mounted, as well as on the location of the tire (front or rear) on the vehicle. On passenger vehicles, the recommended pressure will be between about 23 and 26 lbs./in.$^2$.

FIGURE 21 shows a cog 26, in phantom lines, this cog having embedded in it a metal insert 40 which enables the tire to obtain better traction, for example on ice-covered roads. The insert 40 is channel-shaped and has edges that are flush with the outer surface of the cog, so that the insert will not damage the pavement. At the same time, the rubber mass of the cog protects the insert against metal wear. As shown in FIGURE 21, the channel-shaped insert 40 extends in a direction parallel to the axis of the tire.

FIGURE 22 is similar to FIGURE 21 but shows the length of the channel-shaped insert 50 as extending in circumferential direction.

FIGURE 23, which is a perspective view of an insert 60, shows the same as having a bottom portion 61 and two webs 62, the former being provided with a cut-out 61a and the latter being provided with notches 62a located in the region of the edges. This configuration of the insert has been found to be particularly well suited for firmly anchoring the insert in the cog.

It will be understood that the above description of the present invention is susceptible to various modifications, changes, and adaptations, and the same are intended to be comprehended within the means and range of equivalents of the appended claims.

What is claimed is:

1. A pneumatic tire of the type which, under load, becomes momentarily wider at that part which touches the ground than at that part of the tire which is opposite the ground-touching part, said tire having a carcass and a plurality of pairs of cogs distributed circumferentially around said carcass and integral therewith, the cogs of each pair being arranged on opposite sides of the carcass and projecting laterally from opposite lateral faces of the carcass, each cog extending laterally a distance which makes the width of the tire in the region of the cogs at least as great as the maximum width of the carcass and radially a distance which makes the diameter of the tire in the region of the cogs at least when the tire does not support a load, at most as great as the maximum diameter of the carcass, in consequence of which said cogs, when the tire, while supporting a load, is on soft ground, will be pressed deeper into the ground than said carcass.

2. A tire as defined in claim 1 wherein the distance between corresponding points of consecutive cogs on the same side of the carcass is at least as great as the length of said part which touches the ground.

3. A tire as defined in claim 1 wherein the cogs of each pair are in axial alignment with each other and hence directly opposite each other on opposite sides of said carcass.

4. A pneumatic tire of the type which, under load, becomes momentarily wider at that part which touches the ground than at that part of the tire which is opposite the ground-touching part, said tire having a carcass and a plurality of pairs of cogs distributed circumferentially around said carcass and integral therewith, the cogs of each pair being arranged on opposite sides of the carcass and projecting laterally from the opposite lateral faces of the carcass, each cog extending laterally a distance which makes the width of the tire in the region of the cogs at least as great as the maximum width of the carcass and radially a distance which makes the diameter of the tire in the region of the cogs, at least when the tire does not support a load, at most as great as the maximum diameter of the carcass, in consequence of which said cogs, when said tire, while supporting a load, is on soft ground, will be pressed deeper into the ground than said carcass, the cogs of each pair being in axial alignment with each other and hence directly opposite each other on opposite sides of said carcass, and the distance between corresponding points of consecutive pairs of cogs being at least as great as the length of said part which touches the ground.

5. A tire as defined in claim 4 wherein said cogs have outer peripheral surfaces which are substantially flush with the outer peripheral surface of said carcass.

6. A tire as defined in claim 4 wherein said cogs have outer peripheral surfaces which are spaced radially inwardly from the outer peripheral surface of said carcass.

7. A tire as defined in claim 4 wherein said cogs extend radially inwardly to a point which is approximately level with the center of the cross section of the carcass.

8. A tire as defined in claim 4 wherein said cogs have a generally rectangular configuration.

9. A tire as defined in claim 8 wherein said cogs have square edges.

10. A tire as defined in claim 8 wherein said cogs have rounded edges.

11. A tire as defined in claim 4 wherein said cogs have a generally trapezoidal configuration.

12. A tire as defined in claim 4 wherein said cogs have respective inserts embedded therein for providing increased traction.

13. A tire as defined in claim 12 wherein said inserts have edges which are flush with the outer surfaces of the respective cogs.

14. A tire as defined in claim 12 wherein said inserts are channel-shaped.

15. A tire as defined in claim 14 wherein said channel-shaped inserts extend in a direction parallel to the axis of the tire.

16. A tire as defined in claim 14 wherein said channel-shaped inserts extend in circumferential direction.

17. A tire as defined in claim 14 wherein said channel-shaped inserts have a bottom portion and two web portions, the latter having edges which are flush with the outer surface of the respective cog.

18. A tire as defined in claim 17 wherein said bottom portion of said inserts are provided with a cut-out and wherein said web portions of said inserts are provided with notches in the region of the edges.

References Cited by the Examiner

UNITED STATES PATENTS 2,704,102   3/1955   Starr et al. _____ 152—209 X

FOREIGN PATENTS 527,995   10/1940   Great Britain.
1,237,762   6/1959   France.

ARTHUR L. LA POINT, *Primary Examiner.*